United States Patent
Wang et al.

(10) Patent No.: US 12,062,814 B2
(45) Date of Patent: Aug. 13, 2024

(54) SOFT-PACK BATTERY MODULE, BATTERY PACK, AND DEVICE USING SOFT-PACK BATTERY MODULE

(71) Applicant: CONTEMPORARY AMPEREX TECHNOLOGY CO., LIMITED, Fujian (CN)

(72) Inventors: Yongguang Wang, Fujian (CN); Kaijie You, Fujian (CN); Xingdi Chen, Fujian (CN); Yu Tang, Fujian (CN); Zhichao Wang, Fujian (CN)

(73) Assignee: CONTEMPORARY AMPEREX TECHNOLOGY CO., LIMITED, Fujian (CN)

( * ) Notice: Subject to any disclaimer, the term of this patent is extended or adjusted under 35 U.S.C. 154(b) by 286 days.

(21) Appl. No.: 17/559,591

(22) Filed: Dec. 22, 2021

(65) Prior Publication Data
US 2022/0115752 A1    Apr. 14, 2022

Related U.S. Application Data

(63) Continuation of application No. PCT/CN2020/128467, filed on Nov. 12, 2020.

(30) Foreign Application Priority Data

Nov. 19, 2019 (CN) .......................... 201922002614.4

(51) Int. Cl.
*H01M 50/536* (2021.01)
*H01M 10/04* (2006.01)
(Continued)

(52) U.S. Cl.
CPC ..... *H01M 50/536* (2021.01); *H01M 10/0413* (2013.01); *H01M 50/209* (2021.01);
(Continued)

(58) Field of Classification Search
None
See application file for complete search history.

(56) References Cited

U.S. PATENT DOCUMENTS

2013/0171485 A1    7/2013  Kodera et al.
2013/0181826 A1*   7/2013  Yang ................... H01M 50/271
                                                          340/455
(Continued)

FOREIGN PATENT DOCUMENTS

CN    203326006 U    12/2013
CN    106207069 A    12/2016
(Continued)

OTHER PUBLICATIONS

European Search Report issued on Jun. 27, 2022 in EP Patent Application No. 20889152.3.
(Continued)

*Primary Examiner* — Amanda J Barrow
(74) *Attorney, Agent, or Firm* — Venable LLP

(57) ABSTRACT

This application discloses a soft-pack battery module, including at least two battery stack layers stacked in a thickness direction of battery cells, where each battery stack layer includes a battery cell and a connecting piece connected to a tab of the battery cell, the connecting piece includes a first section and a second section, the first section is connected to the tab, the second section is connected to the first section, the second section is arranged by a side of the first section, the second section extends toward a large surface of the battery cell and covers at least a part of the large surface of the battery cell, and an insulating material is provided on a side of the second section away from the large surface of the battery cell.

10 Claims, 7 Drawing Sheets

(51) Int. Cl.
 *H01M 50/209* (2021.01)
 *H01M 50/333* (2021.01)
 *H01M 50/502* (2021.01)
 *H01M 50/533* (2021.01)

(52) U.S. Cl.
 CPC ....... *H01M 50/502* (2021.01); *H01M 50/533* (2021.01); *H01M 2220/20* (2013.01)

(56) References Cited

U.S. PATENT DOCUMENTS

| | | | |
|---|---|---|---|
| 2016/0099456 A1* | 4/2016 | Kwon | H01M 50/507 429/94 |
| 2018/0175346 A1* | 6/2018 | Schmid-Schoenbein | H01M 50/553 |
| 2019/0288357 A1* | 9/2019 | Son | H01M 10/617 |
| 2019/0319229 A1* | 10/2019 | Ha | H01M 10/0585 |

FOREIGN PATENT DOCUMENTS

| | | | |
|---|---|---|---|
| CN | 208422971 U | 1/2019 | |
| CN | 109659481 A | 4/2019 | |
| CN | 110034356 * | 7/2019 | .......... H01M 10/615 |
| CN | 210744060 U | 6/2020 | |
| DE | 102014218879 A1 | 4/2015 | |
| EP | 1151485 A1 | 11/2001 | |
| EP | 1151485 B1 | 7/2003 | |
| EP | 3926750 B1 | 7/2023 | |
| JP | 2002117828 A | 4/2002 | |
| WO | 0041253 A1 | 7/2000 | |

OTHER PUBLICATIONS

Extended European Search Report issued on Jun. 27, 2022 in EP Application No. 20889152.3.
Intention to Grant issued on May 9, 2023 in EP Application No. 20889152.3.
International Search Report and Written Opinion mailed Feb. 20, 2021 in International Application PCT/CN2020/128467.

* cited by examiner

SOFT-PACK BATTERY MODULE, BATTERY PACK, AND DEVICE USING SOFT-PACK BATTERY MODULE

CROSS-REFERENCE TO RELATED APPLICATIONS

This application is a National Stage of International Application No. PCT/CN2020/128467 filed on Nov. 12, 2020, which claims the priority of the Chinese Patent Application No. 201922002614.4, entitled "SOFT-PACK BATTERY MODULE, BATTERY PACK, AND DEVICE USING SOFT-PACK BATTERY MODULE AS POWER SOURCE" and filed on Nov. 19, 2019, both of which are incorporated herein by reference in their entireties.

TECHNICAL FIELD

Embodiments of this application relate to the field of battery technologies, and in particular, to a soft-pack battery module, a battery pack, and a device using a soft-pack battery module.

BACKGROUND

Tabs of soft-pack battery cells have weak mechanical strength. When being joined to assemble a module, soft-pack battery cells usually need to be supported by copper bars fixed on a wire harness isolation board. Generally, the tabs of the soft-pack battery cells pass through the wire harness isolation board first, and then ride on the copper bars for welding.

SUMMARY

The purpose of this application is to provide a soft-pack battery module, a battery pack, and a device using a soft-pack battery module, to enhance strength of soft-pack battery modules.

A first aspect of this application provides a soft-pack battery module, including at least two battery stack layers stacked in a thickness direction of battery cells, where each battery stack layer includes a battery cell and a connecting piece connected to a tab of the battery cell, the connecting piece includes a first section and a second section, the first section is connected to the tab, the second section is connected to the first section, the second section is arranged by a side of the first section, the second section extends toward a large surface of the battery cell and covers at least a part of the large surface of the battery cell, and an insulating material is provided on a side of the second section away from the large surface of the battery cell.

The second section of the soft-pack battery module covers at least a part of the large surface of the battery cell, so that overall strength of the soft-pack battery module can be enhanced. In addition, the insulating material is arranged on the side of the second section away from the large surface of the battery cell, so that a short circuit caused by contact between adjacent battery stack layers can be avoided.

In some embodiments, the first section includes two spaced connecting arms, one of the connecting arms is connected to a positive tab, and the other connecting arm is connected to a negative tab.

A groove is provided between the two connecting arms, which can help to fold the connecting piece.

In some embodiments, in the extension direction of the tab relative to the battery cell, a length of the second section is greater than a length of the large surface of the battery cell, so that the second section covers the large surface of the battery cell in the extension direction.

The length of the second section is greater than the length of the large surface of the battery cell so that the second section covers the large surface of the battery cell in the extending direction, helping to enhance the overall strength of the soft-pack battery module in the extending direction of the battery cells.

In some embodiments, each battery stack layer includes one or more battery cells.

In some embodiments, the connecting piece includes an inter-layer connecting piece and an intra-layer connecting piece. The inter-layer connecting piece is a bent structure to connect battery cells located at two adjacent battery stack layers, and the intra-layer connecting piece connects the battery cells at a same battery stack layer.

In some embodiments, the soft-pack battery module further includes a first insulating film attached to a side of the battery stack layer on which the second section is provided, the first insulating film includes a bent insulating film section attached to the inter-layer connecting piece and a planar insulating film section attached to the intra-layer connecting piece, and the bent insulating film section is connected to the planar insulating film section.

In some embodiments, the soft-pack battery module includes the first insulating films respectively attached to two sides of the battery stack layer.

In some embodiments, the soft-pack battery module further includes a heating film attached to the first insulating film, and the heating film includes a bent heating film section attached to the bent insulating film section and a planar heating film section attached to the planar insulating film section.

In some embodiments, the soft-pack battery module further includes a second insulating film attached to the heating film, and the second insulating film includes a bent insulating film section attached to the bent heating film section and a planar insulating film section attached to the planar heating film section.

In some embodiments, the soft-pack battery module further includes a circuit board. The circuit board includes a bent circuit board section connected to the inter-layer connecting piece and a circuit board planar section extending along the battery stack layer and connected to the intra-layer connecting piece.

The circuit board is flexible and small in size, helping to save internal space of the assembled battery module.

A second aspect of this application provides a battery pack, including a box body and the soft-pack battery module according to the first aspect of this application, where the soft-pack battery module is accommodated in the box body.

A third aspect of this application provides a device using a soft-pack battery module as a power source, including a driving apparatus and the soft-pack battery module according to the first aspect of this application, where the driving apparatus is configured to provide driving power for the device, and the soft-pack battery module is configured to provide electric energy for the driving apparatus.

Based on the technical solution provided in this application, the soft-pack battery module includes at least two battery stack layers stacked in a thickness direction of battery cells, where each battery stack layer includes a battery cell and a connecting piece connected to a tab of the battery cell, the connecting piece includes a first section and a second section, the first section and the second section are respectively located on two sides of the tab to sandwich the tab between the first section and the second section, the first section is connected to the tab, and the second section extends toward a large surface of the battery cell and covers at least a part of the large surface of the battery cell. The second section of the soft-pack battery module in this application covers at least a part of the large surface of the battery cell so as to enhance overall strength of the soft-pack battery module.

Other features and advantages of this application become apparent from the following detailed description of exemplary embodiments of this application with reference to the accompanying drawings.

BRIEF DESCRIPTION OF DRAWINGS

To describe the technical solutions in the embodiments of this application or in the prior art more clearly, the following briefly describes the accompanying drawings for describing the embodiments or the prior art. Apparently, the accompanying drawings in the following description show some embodiments of this application, and a person of ordinary skill in the art may still derive other drawings from these accompanying drawings without creative efforts.

The drawings described herein are intended for a further understanding of this application and constitute a part of this application. Example embodiments of this application and descriptions thereof are intended to explain this application, and do not constitute any inappropriate limitation on this application.

Figure 1:
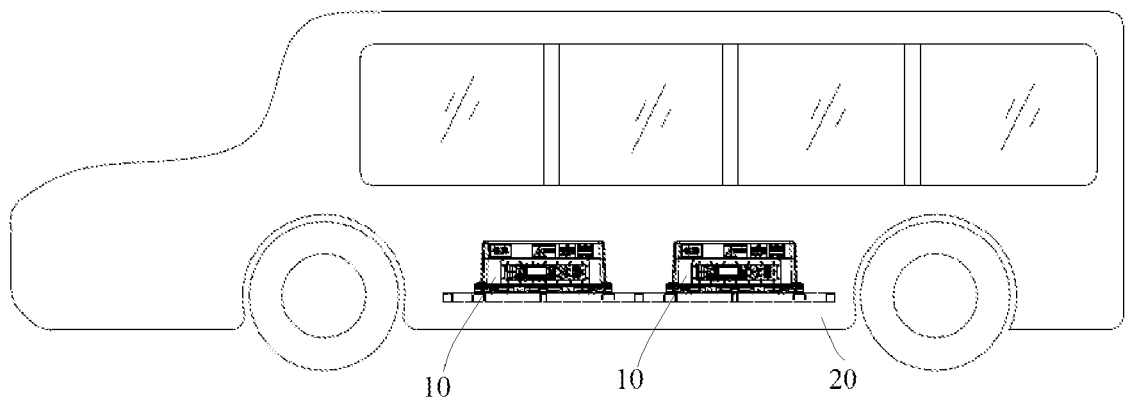
FIG. 1 is a schematic structural diagram of a vehicle according to an embodiment of this application.

The reference signs respectively represent:
1. Soft-pack battery module;
11. Battery cell; 111. Negative tab; 112. Positive tab;
12. Connecting piece; 121. First section; 121a. Connecting arm; 122. Second section;
12A. Inter-layer connecting piece; 12B. Intra-layer connecting piece;
13. First insulating film;
14. Heating film;
15. Circuit board;
16. Second insulating film;
2. Upper box body;
3. Lower box body;
10. Battery pack;
20. Vehicle body;
P. Battery cell connection group; and
Q. Battery stack layer.
17. Insulating material

DESCRIPTION OF EMBODIMENTS

The following clearly and completely describes the technical solutions in the embodiments of this application with reference to the accompanying drawings in the embodiments of this application. Apparently, the described embodiments are only some rather than all of the embodiments of this application. The following description of at least one exemplary embodiment is merely illustrative and definitely is not construed as any limitation on this application or on use of this application. All other embodiments obtained by a person of ordinary skill in the art based on the embodiments of this application without creative efforts shall fall within the protection scope of this application.

Unless otherwise specified, relative arrangements of components and steps, numerical expressions, and numerical values set forth in these embodiments do not constitute a limitation on the scope of this application. Moreover, it should be understood that, for ease of description, sizes of various parts shown in the accompanying drawings are not drawn to scale. The technologies, methods, and devices known to those of ordinary skill in the related art may not be discussed in detail, but where appropriate, the technologies, methods, and devices should be regarded as being authorized as a part of the specification. In all examples shown and discussed herein, any specified value should be interpreted as merely illustrative, rather than restrictive. Therefore, other examples of the exemplary embodiments may have different values. It should be noted that similar reference signs and letters indicate similar items in the following drawings, and therefore once an item is defined in one drawing, it does not need to be further discussed in the subsequent drawings.

For ease of description, spatially relative terms such as "above". "on the top of". "on the surface of", and "over" may be used herein to describe a spatial positional relationship between one means or feature and another means or feature shown in the drawings. It should be understood that the spatially relative terms are intended to encompass different orientations in use or operation other than the orientation of the means described in the drawings. For example, if the means in the drawing are inverted, a means described as "above other means or structures" or "over other means or structures" then is positioned "below other means or structures" or "under other means or structures". Thus, the exemplary term "above" may include both orientations of being "above" and "below". The means may also be positioned in other different ways, and the spatially relative description used herein will be explained accordingly.

The following describes a structure and an assembly method of the soft-pack battery module according to the embodiments of this application in detail with reference to FIG. 1 to FIG. 10.

The embodiments of this application provide a device using a soft-pack battery module 1 as a power source, a battery pack 10, a soft-pack battery module 1, and an assembly method of the soft-pack battery module 1. The device using a soft-pack battery module 1 as a power source includes the soft-pack battery module 1 and a driving apparatus that is configured to provide driving power for the device, where the soft-pack battery module 1 provides electric energy for the driving apparatus. The driving power of the device may be all electric energy, or may be partly electric energy and partly other energy. For example, the device may further include a power source that provides mechanical energy, such as an engine. Any device using a soft-pack battery module 1 as a power source falls within the protection scope of this application.

The device in this embodiment of this application may be a mobile device such as a vehicle, a ship, and a small-size aircraft. A vehicle is used as an example. The vehicle in this embodiment of this application may be a new energy vehicle. The new energy vehicle may be a battery electric vehicle, or may be a hybrid electric vehicle or an extended-range electric vehicle. As shown in FIG. 1, the vehicle includes a battery pack 10 and a vehicle body 20. The battery pack 10 is arranged inside the vehicle body 20 and includes at least one soft-pack battery module 1. The vehicle body 20 is provided with a driving motor. The driving motor is electrically connected to the battery pack 10, and the battery pack 10 provides electric energy for the driving motor. The driving motor is connected to wheels of the vehicle body 20 through a transmission mechanism to drive the vehicle. Specifically, the battery pack 10 may be horizontally arranged at the bottom of the vehicle body 20.

Figure 2:
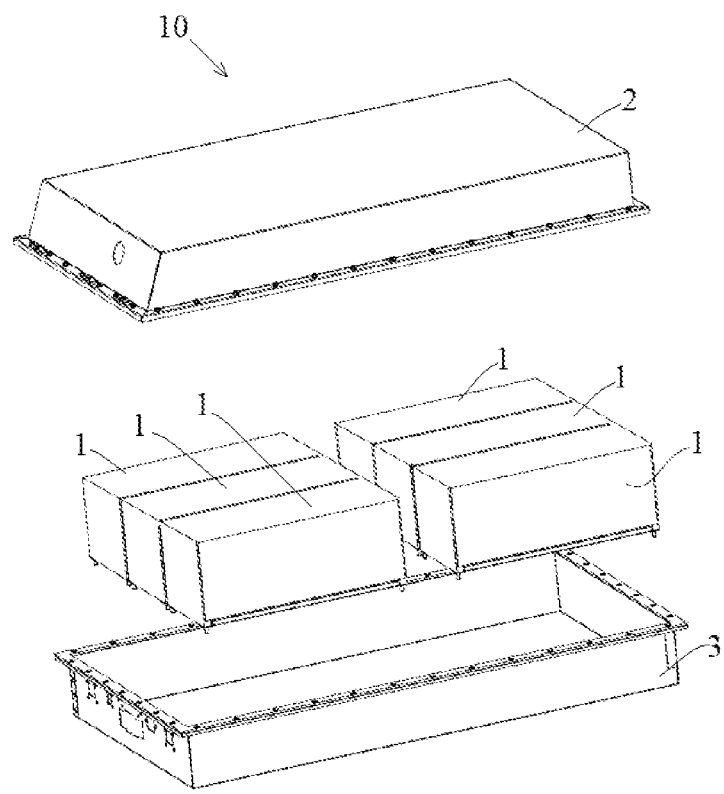
FIG. 2 is a schematic structural diagram of a battery pack in FIG. 1.

The battery pack 10 in this embodiment of this application includes at least one soft-pack battery module 1. Specifically, in this embodiment, as shown in FIG. 2, the battery pack 10 in this embodiment includes a plurality of soft-pack battery modules 1 and a box body configured to accommodate the plurality of soft-pack battery modules 1. The box body has an accommodating cavity, and the plurality of soft-pack battery modules 1 are arranged in order in the accommodating cavity. Specifically, the box body in this embodiment is a box-shaped box and includes a lower box body 3 configured to accommodate the soft-pack battery module 1 and an upper box body 2 engaged to the lower box 3. In other embodiments not shown in the accompany drawings, the box body may alternatively be a frame-shaped box body, a disk-shaped box body, or the like.

Figure 3:
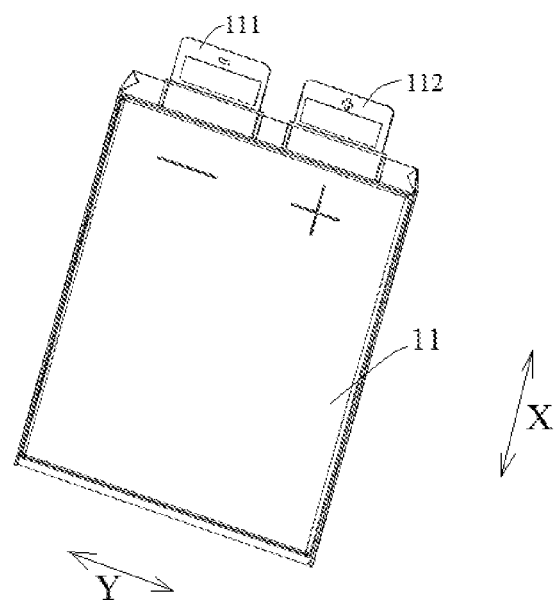
FIG. 3 is a schematic structural diagram of a battery cell according to an embodiment of this application.
Figure 4:
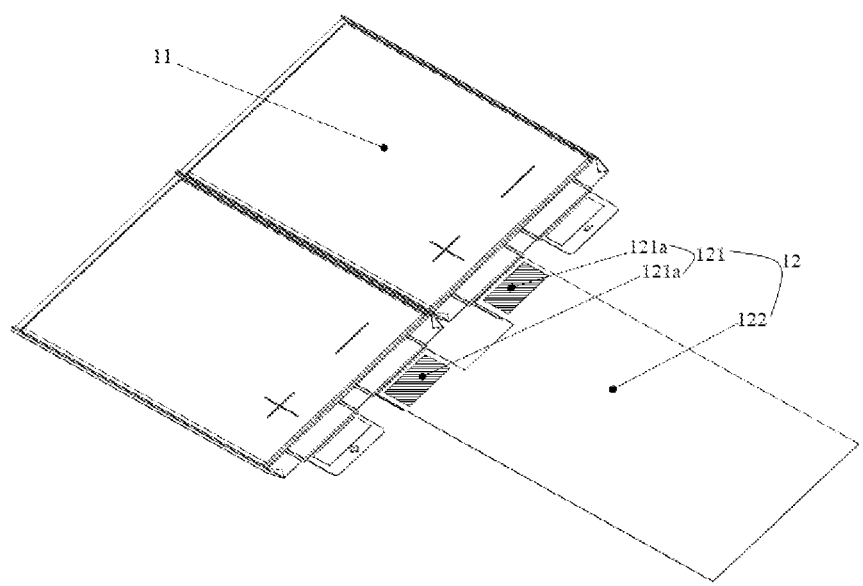
FIG. 4 is a schematic diagram of a structure of two battery cells connected to a connecting piece.

As shown in FIG. 3, a battery cell 11 in this embodiment includes a negative tab 111 and a positive tab 112, and the negative tab 111 and the positive tab 112 are both located at a same end of the battery cell 11. The tabs extend in a first direction X relative to the battery cell 11, and a second direction Y is perpendicular to the first direction X. As shown in FIG. 4, a connecting piece 12 in this embodiment includes a first section 121 and a second section 122. The first section 121 includes two spaced connecting arms 121*a*, and the two connecting arms 121*a* are respectively connected to the positive tab and the negative tab. For example, the connecting arm 121*a* may be welded to the tab.

Figure 5:
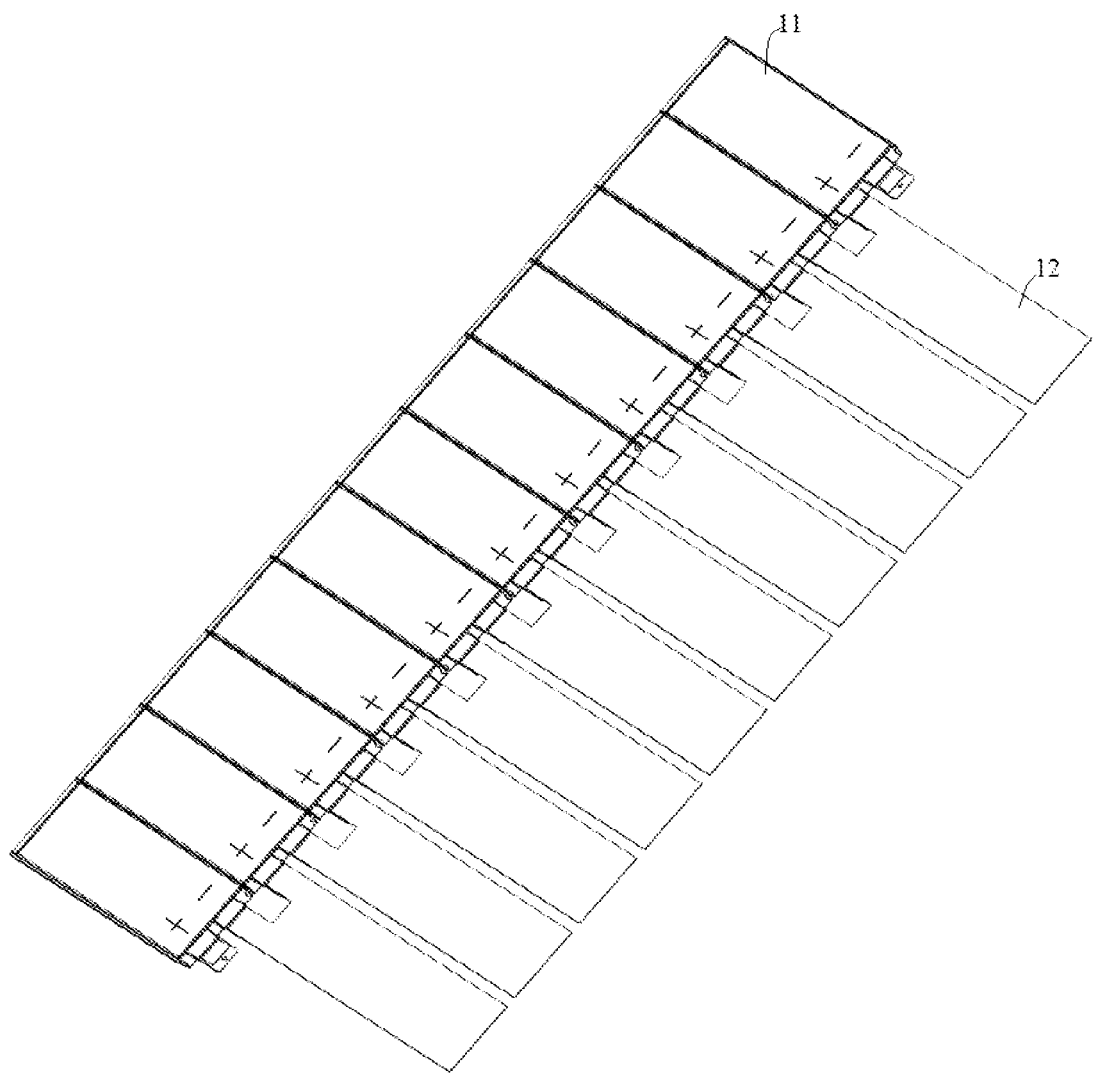
FIG. 5 is a schematic diagram of a structure of a plurality of battery cells connected to a plurality of connecting pieces.
Figure 6:
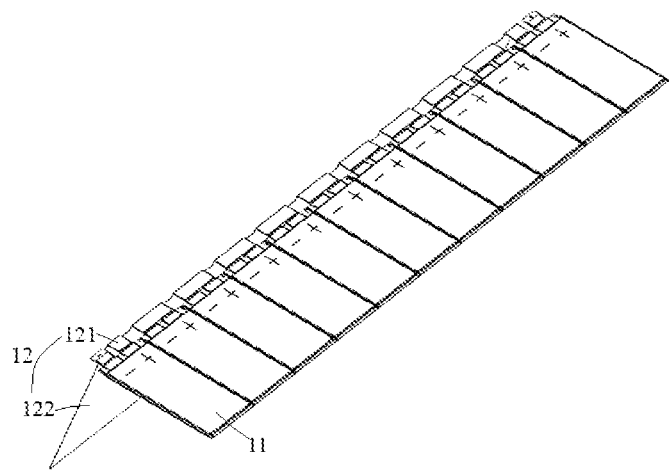
FIG. 6 is a schematic diagram of a folding process of the plurality of connecting pieces in FIG. 5.
Figure 7:
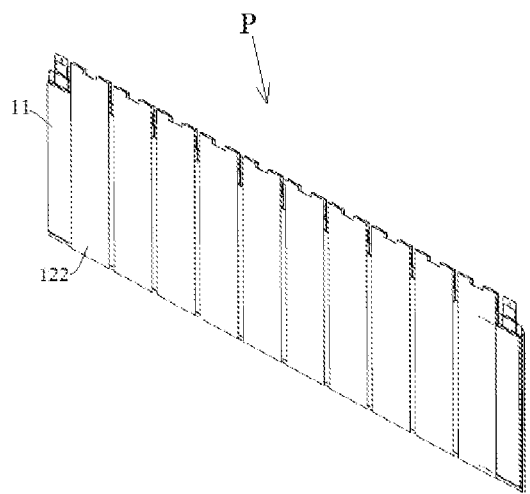
FIG. 7 is a schematic structural diagram of a battery cell connection group resulting from folding a plurality of connecting pieces according to an embodiment of the application.
Figure 8:
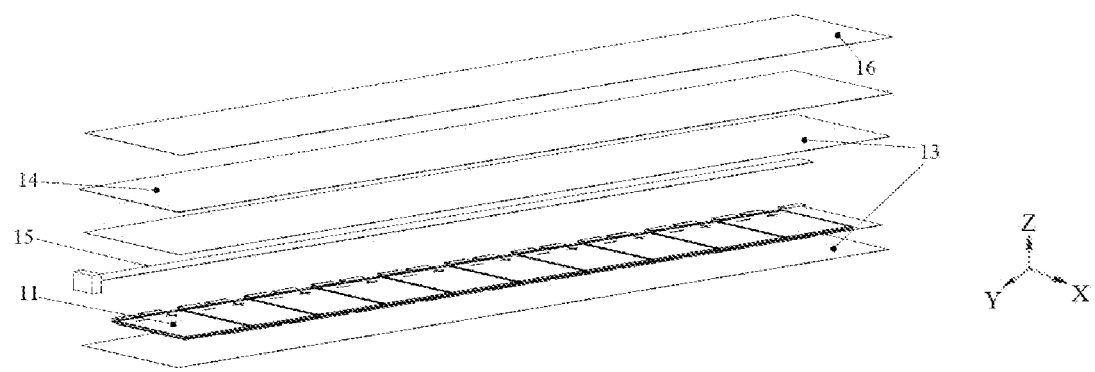
FIG. 8 is a schematic exploded structure of a soft-pack battery module according to an embodiment of this application.
Figure 9:
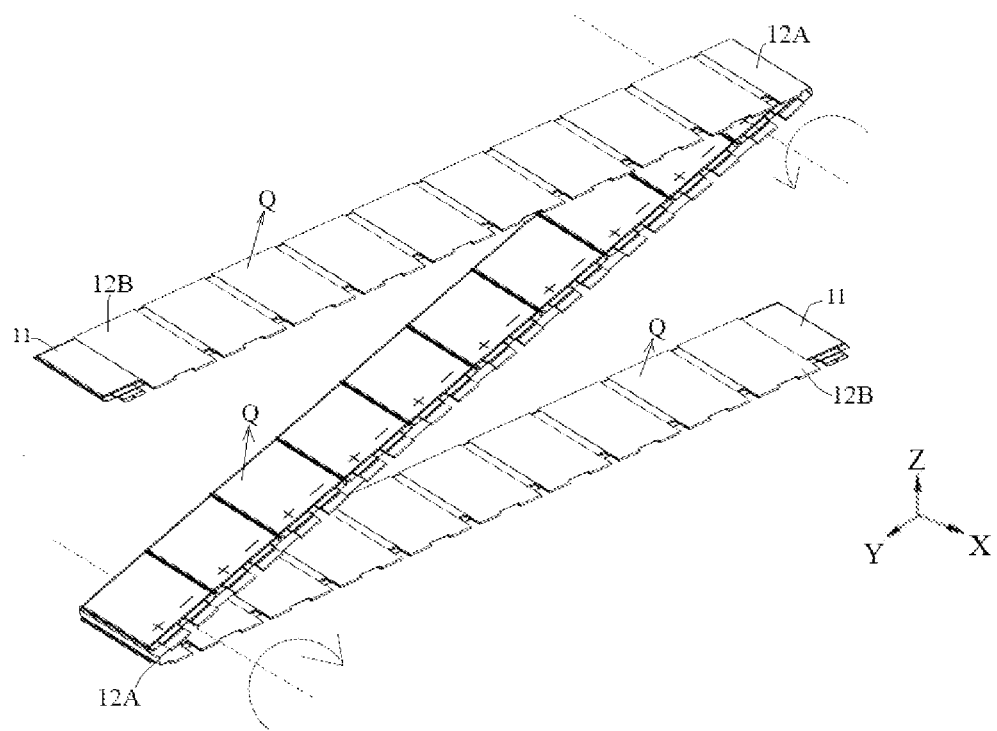
FIG. 9 is a schematic diagram of a process of folding a battery cell connection group according to an embodiment of this application.

A method for joining a plurality of battery cells 11 to assemble a soft-pack battery module 1 is shown in FIG. 5 to FIG. 9. Specifically, as shown in FIG. 5, large surfaces of the plurality of battery cells 11 are laid flat and arranged in order into a row; and a plurality of connecting pieces 12 are used to connect tabs of the plurality of battery cells 11. As shown in FIG. 6, the plurality of connecting pieces 12 are folded along a fold line in the second direction Y, so that the second split bodies 122 are folded toward the large surfaces of the battery cells 11 and cover at least a part of the large surfaces of the battery cells 11, and the battery cells 11 and the connecting pieces 12 in this embodiment together form a battery cell connection group P, as shown in FIG. 7. As shown in FIG. 9, the battery cell connection group P is folded along a fold line in the first direction X, so that the plurality of battery cells 11 are stacked to form a soft-pack battery module shown in FIG. 10.

Figure 10:
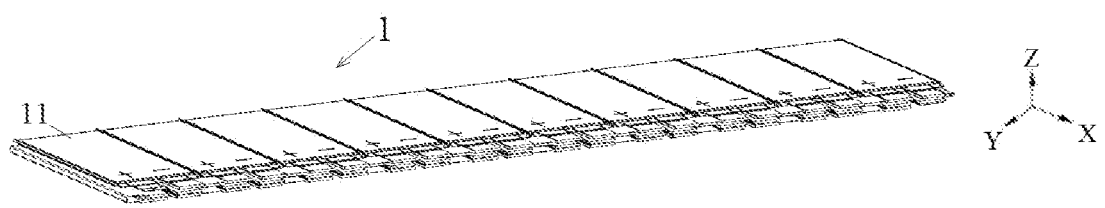
FIG. 10 is a schematic structural diagram of a soft-pack battery module according to an embodiment of this application.
Figure 11:
FIG. 11 is a cross-sectional view of the second section according to an embodiment of this application.

As shown in FIG. 10, the soft-pack battery module in this embodiment of this application includes at least two battery stack layers Q stacked in a thickness direction Z of battery cells 11, where each battery stack layer Q includes battery cells 11 and connecting pieces 12 connected to tabs of the battery cells 11, the connecting piece 12 includes a first section 121 and a second section 122, the first section 121 and the second section 122 are connected and respectively located on two sides of a tab to sandwich the tab between the first section 121 and the second section 122, the first section 121 is connected to the tab, the second section 122 extends toward a large surface of the battery cell 11 and covers at least a part of the large surface of the battery cell 11, and as shown in FIG. 11, an insulating material 17 is provided on a side of the second section 122 away from the large surface of the battery cell 11. The second section 122 of the soft-pack battery module 1 in this embodiment of this application covers at least a part of the large surface of the battery cell 11 so as to enhance overall strength of the soft-pack battery module 1. In addition, in this embodiment of this application, the insulating material is arranged on the side of the second section 122 away from the large surface of the battery cell 11, so that a short circuit caused by contact between adjacent battery stack layers Q can be avoided.

In other embodiments, the first section 121 and the second section 122 may alternatively be arranged side by side on a same side of the tab.

As shown in FIG. 4, the first split 121 includes two spaced connecting arms 121*a*, one of the two connecting arms 121*a* is connected to a positive tab, and the other connecting arm 121*a* is connected to a negative tab. A groove is provided between the two connecting arms 121*a*, which can help to fold the connecting piece 12. In some embodiments, in the first direction X, a depth of the groove is greater than a length of the connecting arm 121*a*, meaning that the groove extends to the second section 122.

In this embodiment, as shown in FIG. 7, in the first direction X, a length of the second section 122 is greater than a length of the large surface of the battery cell 11 so that the second section 122 covers the large surface of the battery cell 11 in the first direction X. Such an arrangement helps to enhance overall strength of the soft-pack battery module 1 in the first direction X of the battery cells 11.

Specifically, the soft-pack battery module 1 in this embodiment further includes a first insulating film 13 attached to a side of the battery stack layer Q on which the second section 122 is provided. To be specific, referring to FIG. 8, before a battery cell connection group P is folded, the first insulating film 13 is attached to a lower side of the battery cell connection group P in the thickness direction Z of the battery cells 11, and the first insulating film 13 and the battery cell connection group P are folded together. In some embodiments, referring to FIG. 8, before a battery cell connection group P is folded, the first insulating film 13 is attached to both sides of the battery cell connection group P in the thickness direction Z of the battery cells 11, and the first insulating film 13 and the battery cell connection group P are folded together. Specifically, the first insulating film 13 is wrapped around the battery cell connection group P by using a hot pressing technology. The soft-pack battery module 1 thus formed has the first insulating film 13 attached to both sides of the battery stack layer Q in the thickness direction.

To realize an integrated heating film function, the assembly method in this embodiment further includes: laying a heating film 14 and a second insulating film 16 on the first insulating film 13 in order, and folding the battery cell connection group P, the first insulating film 13, the heating film 14, and the second insulating film 16 together. The heating film 14 may be a thermally conductive aluminum plate.

In some embodiments, the assembly method in this embodiment further includes: connecting a circuit board 15 to the battery cell connection group P, where the circuit board 15 is connected to a plurality of connecting pieces 12. Then, the first insulating film 13 is attached to the battery cell connection group P and the circuit board 15, and the battery cell connection group P, the first insulating film 13, and the circuit board 15 are folded together. Specifically, in this embodiment, the circuit board 15 may be a flexible printed circuit board (FPC), a printed circuit board (PCB), a flexible flat cable (FFC), or the like. The circuit board 15 is configured to collect information of the battery cells 11. In some embodiments, the circuit board 15 is a flexible printed circuit board, such as an FPC, and the flexible printed circuit board is flexible and small in size, helping to save internal space of the assembled battery module.

As shown in FIG. 9 and FIG. 10, the connecting piece 12 in this embodiment includes an inter-layer connecting piece 12A and an intra-layer connecting piece 12B. The inter-layer connecting piece 12A is a bent structure to connect battery cells 11 located at two adjacent battery stack layers Q. and the intra-layer connecting piece 12B connects the battery cell 11 at a same battery stack layer Q.

In this embodiment, the first insulating film 13 of the soft-pack battery module 1 includes a bent insulating film section attached to the inter-layer connecting piece 12A and a planar insulating film section attached to the intra-layer connecting piece 12B, and the bent insulating film section is connected to the planar insulating film section.

In this embodiment, the soft-pack battery module 1 further includes a heating film 14 attached to the first insulating film 13, and the heating film 14 includes a bent heating film section attached to the bent insulating film section and a planar heating film section attached to the planar insulating film section.

In this embodiment, the soft-pack battery module 1 further includes a second insulating film 16 attached to the heating film 14, and the second insulating film 16 includes a bent insulating film section attached to the bent heating film section and a planar insulating film section attached to the planar heating film section.

In this embodiment, the soft-pack battery module 1 further includes a circuit board 15. The circuit board 15 includes a bent circuit board section connected to the inter-layer connecting piece 12A and a circuit board planar section extending along the battery stack layer Q and connected to the intra-layer connecting piece 12B.

As shown in FIG. 10, each battery stack layer Q in this embodiment includes a plurality of battery cells 11. This is determined by the number of battery cells 11 provided between adjacent fold lines when the battery cell connection group P is folded multiple times as shown in FIG. 9.

In other embodiments, the battery stack layer Q may alternatively include one battery cell, for example, a battery cell connection group P having two battery cells connected in series is folded in half once. The battery stack layer Q may alternatively include two battery cells, for example, the battery cell connection group having four battery cells connected in series is folded in half once. Certainly, the battery stack layer Q may have one or more battery cells by folding the battery cell connection group multiple times.

Finally, it should be noted that the foregoing embodiments are merely intended to describe the technical solutions of this application, but not intended to constitute any limitation. Although this application is described in detail with reference to preferred embodiments, persons of ordinary skill in the art should understand that modifications can be made to the embodiments of this application or equivalent replacements may be made to some technical features, without departing from the spirit of the technical solutions of this application. All such modifications or replacements shall fall within the scope of the technical solution claimed in this application.

What is claimed is:

1. A soft-pack battery module, comprising:
at least two battery stack layers stacked in a thickness direction of battery cells, wherein each battery stack layer comprises a plurality of battery cells and a plurality of connecting pieces connected to tabs of the battery cells,
wherein the connecting pieces are electrically conductive and each connecting piece comprises a first section and a second section, the first section is electrically connected to the tabs of two adjacent battery cells of the plurality of battery cells, the second section is connected to the first section, the second section is folded to cover respective large surfaces of the two adjacent battery cells of the plurality of battery cells and a length of each second section measured in a first direction is greater than a length of the large surface of each battery cell measured in the first direction, wherein the first direction is parallel to the longest dimension of each battery cell, and an insulating material is provided on a side of the second section away from the respective large surfaces of the two adjacent battery cells.

2. The soft-pack battery module according to claim 1, wherein each first section of the plurality of connecting pieces comprises two spaced connecting arms, one of the two connecting arms is connected to a positive tab of one battery cell of the two adjacent battery cells and the other of the two connecting arms is connected to a negative tab of the other battery cell of the two adjacent battery cells.

3. The soft-pack battery module according to claim 1, wherein the plurality of connecting pieces comprise an inter-layer connecting piece and an intra-layer connecting piece, the inter-layer connecting piece is a bent structure for connecting the battery cells at two adjacent battery stack layers, and the intra-layer connecting piece connects the battery cells at a same battery stack layer.

4. The soft-pack battery module according to claim 3, wherein the soft-pack battery module further comprises a first insulating film attached to a side of the battery stack layer on which the second section is provided, the first insulating film comprises a bent insulating film section attached to the inter-layer connecting piece and a planar insulating film section attached to the intra-layer connecting piece, and the bent insulating film section is connected to the planar insulating film section.

5. The soft-pack battery module according to claim 4, wherein the soft-pack battery module comprises first insulating films respectively attached to two sides of each battery stack layer of at least two battery stack layers.

6. The soft-pack battery module according to claim 4, wherein the soft-pack battery module further comprises a heating film attached to the first insulating film, and the heating film comprises a bent heating film section attached to the bent insulating film section and a planar heating film section attached to the planar insulating film section.

7. The soft-pack battery module according to claim 6, wherein the soft-pack battery module further comprises a second insulating film attached to the heating film, and the second insulating film comprises a bent insulating film section attached to the bent heating film section and a planar insulating film section attached to the planar heating film section.

8. The soft-pack battery module according to claim 4, wherein the soft-pack battery module further comprises a circuit board, the circuit board comprises a circuit board bent section connected to the inter-layer connecting piece and a circuit board planar section extending along the battery stack layer and connected to the intra-layer connecting piece.

9. A battery pack, comprising a box body and the soft-pack battery module according to claim 1, wherein the soft-pack battery module is accommodated in the box body.

10. A device using a soft-pack battery module as a power source, comprising a driving apparatus and the soft-pack battery module according to claim 1, wherein the driving apparatus is configured to provide driving power for the device, and the soft-pack battery module is configured to provide electric energy for the driving apparatus.

* * * * *